May 20, 1958  R. G. LUTRARIO  2,835,117
GEM SETTING WITH GEM BIASED ORNAMENTAL SADDLE MEMBER
Filed May 18, 1954
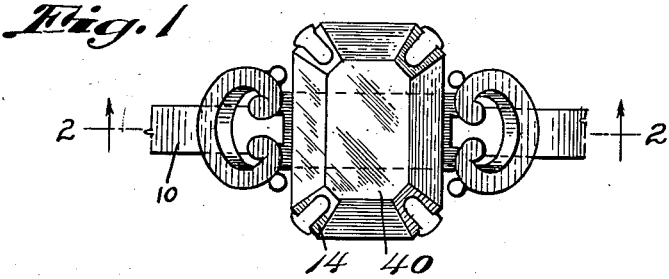
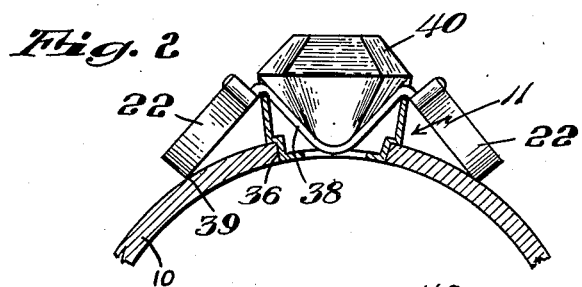
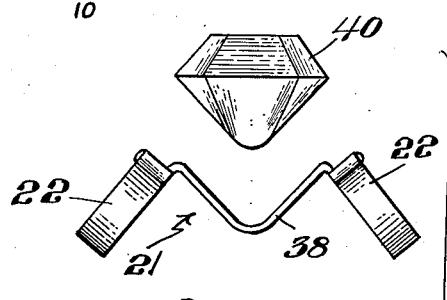
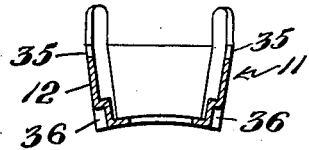
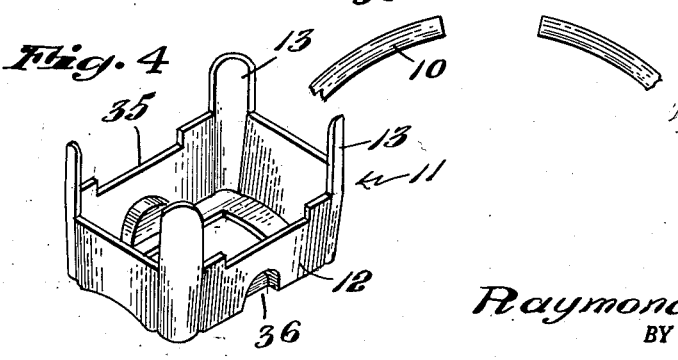
INVENTOR.
Raymond G. Lutrario
BY
Barlow & Barlow
ATTORNEYS.

United States Patent Office 2,835,117
Patented May 20, 1958

2,835,117

GEM SETTING WITH GEM BIASED ORNAMENTAL SADDLE MEMBER

Raymond G. Lutrario, Providence, R. I., assignor to Uncas Manufacturing Company, a corporation of Rhode Island Application May 18, 1954, Serial No. 430,608

4 Claims. (Cl. 63—27)

This invention relates to a finger ring and method of making the same.

Finger rings are usually constructed with some sort of a top member such as a gem setting which is secured to the shank or band which extends about the finger and frequently auxiliary ornaments are located each side of the top member to enhance the appearance of the ring. A ring of this construction is usually formed by hard soldering the shank to the top member and then soft soldering individually the auxiliary side ornaments to the shank or to the top member or to both at either side of the top member. This requires three distinct soldering operations and considerable skill in holding the parts in aligned relation so that they will be symmetrically located.

One of the objects of this invention is to simplify the assembly and soldering operation.

Another object is to so align the parts that it will be far simpler for the operator to hold the parts in aligned position when the solder operation is performed.

Another object of the invention is to reduce the number of pieces which need to be handled in the performance of the assembly of the parts involved.

With these and other objects in view, the invention consists of certain novel features of construction, as will be more fully described, and particularly pointed out in the appended claims.

In the accompanying drawings:

Figure 1 is a top plan view of a finger ring modified in structure;

Figure 2 is a sectional view thereof on line 2—2 of Figure 1;

Figure 3 is an exploded view showing the various parts of the ring with the shank of the ring fragmentally shown; and Figure 4 is a perspective view of the top member showing the recess therein for receiving the other parts of the ring.

In proceeding with this invention, I recess or slot a part of the top member and form from a stamping or the like an auxiliary ornamental unit having members for location at either side of the top member with a connection between them such as a strap which may be set into the slot or recess in the top member. In some cases I then assemble with the top member the shank in contact therewith and with the auxiliary ornamental unit and solder the three parts together in one operation. In other cases the shank may be first soldered to the top member, then the assembly above the auxiliary member, and the auxiliary ornamental member held in place by a gem set in the top member. By an arrangement of slot for the connecting member of the ornamental members, I so locate the parts that they are in alignment so that when secured in place they will be symmetrical.

With reference to the drawings, the ring shank is designated 10 and comprises a circular band. The top member is designated generally 11 and in the present showing comprises a gem setting having inclosing walls 12 and retaining prongs 13 extending upwardly therefrom so that a gem 15 may rest upon a seat at the upper edge of the walls 12 and be held in place by folding inwardly as at 14 the retaining prongs. This setting 11 is shown in the various modifications illustrated in the drawing as recessed at certain locations. The opposite walls are recessed by milling at their upper edges in the showing in Figures 1–4.

The auxiliary ornamental unit is designated generally 21 and comprises ornamental members 22 which are in the form of gem settings and are cup shaped to receive gems therein.

As shown in Figures 1–4, the setting 11 may have opposite walls 12 recessed as at 35 and 36, and the ornamental members 22—22 connected by a strap 38 which will be inserted within the setting 11 and located in the recesses 35. The ends of the shank 10 will be positioned in the recesses 36 and secured to the walls thereof, the ornamental members 22 being attached at the points of contact 39 with the shank. In most cases the top member 11, auxiliary ornamental unit 21, and shank 10 will be assembled in the relation shown in Figure 3 and then secured to each other as by soldering. In some cases, however, it will be advisable and desirable to first solder the shank 10 to the top member 11 and then insert the auxiliary ornamental member 21 in position and secure the ornamental unit 21 in place by placing the gem 40 in the top member 11 so as to engage with the strap 38 against the setting 11, the gem being held in place by bending the prongs 13 against the gem 40.

I claim:

1. In a finger ring, a ring shank, an auxiliary ornamental unit including a strap, a gem setting having opposite side walls, each provided with a recess therein extending inwardly from the upper edge thereof, said strap extending across said setting in said recesses, and a gem secured in said setting and engaging said strap to hold the same secured in position and means to secure said shank to said setting.

2. In a finger ring according to claim 1 wherein said ornamental unit comprises ornamental members secured to said strap on each side of said setting.

3. In a finger ring according to claim 1 wherein said ornamental unit comprises second gem settings secured to said strap at either side of the first said gem setting.

4. In a finger ring, a split ring shank, an auxiliary ornamental unit including a strap, a gem setting having opposite side walls, each provided with an upper and lower recess therein, the ends of said shank being received into the said lower recesses and secured to the walls thereof, said strap extending across said setting in the said upper recesses, and a gem secured in said setting and engaging said strap to hold the same secured in position.

References Cited in the file of this patent

UNITED STATES PATENTS

| | | |
|---|---|---|
| 253,233 | Sprague | Feb. 7, 1882 |
| 630,197 | Dover et al. | Aug. 1, 1899 |
| 736,022 | Rohde | Aug. 11, 1903 |
| 984,058 | Zimmermann | Feb. 14, 1911 |
| 1,453,708 | Gaschke | May 1, 1923 |
| 1,794,784 | Marinelli | Mar. 3, 1931 |
| 2,103,413 | Gaertner | Dec. 28, 1937 |
| 2,150,447 | Karlan | Mar. 14, 1939 |
| 2,763,140 | Lutrario | Sept. 18, 1956 |

FOREIGN PATENTS

| | | |
|---|---|---|
| 128,020 | Germany | Sept. 21, 1899 |
| 204,926 | Great Britain | Oct. 11, 1923 |